United States Patent
Labrecque et al.

(10) Patent No.: US 6,886,494 B2
(45) Date of Patent: May 3, 2005

(54) BOAR CART FOR INSEMINATION OF SOWS

(75) Inventors: Robert Labrecque, St. Bernard de Dorchester (CA); Germain Labrecque, St. Bernard de Dorchester (CA)

(73) Assignee: Conception Ro-Main Inc., St. Bernard de Dorchester (CA)

( * ) Notice: Subject to any disclaimer, the term of this patent is extended or adjusted under 35 U.S.C. 154(b) by 123 days.

(21) Appl. No.: 10/377,395

(22) Filed: Mar. 3, 2003

(65) Prior Publication Data

US 2004/0182327 A1 Sep. 23, 2004

(51) Int. Cl.$^7$ .................................................. A01K 1/00
(52) U.S. Cl. ..................................... 119/453; 296/24.31
(58) Field of Search ................................ 119/453, 454, 119/496, 512, 519, 727; 296/24.31; 600/551

(56) References Cited

U.S. PATENT DOCUMENTS

| | | | |
|---|---|---|---|
| 6,196,975 B1 | 3/2001 | Labrecque et al. | 600/551 |
| 6,336,426 B1 | 1/2002 | Kleinsasser | 119/453 |
| 6,508,202 B2 * | 1/2003 | Kleinsasser | 119/453 |
| 6,793,630 B2 * | 9/2004 | Labrecque et al. | 600/551 |
| 2001/0027752 A1 * | 10/2001 | Kleinsasser | 119/453 |

OTHER PUBLICATIONS

Brochure (2 pages)—Seine Robotics Inc.

* cited by examiner

Primary Examiner—Robert P. Swiatek
(74) Attorney, Agent, or Firm—Adrian D. Battison; Michael R. Williams; Ryan W. Dupuis

(57) ABSTRACT

A boar cart for carrying a boar through alleyways of a sow insemination area for interaction with the sows during insemination is formed by a cage for containing the boar which includes a cage floor on which the boar stands, two sides each defined by vertical bars on a respective side of a longitudinal center line of the cage assembly for confining the boar so that the boar is maintained extending longitudinally of the cage, a cage front and a cage rear. The cage may be rigid or may be defined by a front portion and a rear portion connected together for pivotal articulated movement about a pivot coupling defining a vertical pivot axis arranged substantially at the center line such that the cage can articulate to the left and to the right for navigating left and right corners in the alleyways while the boar is retained in the cage. The cage front and cage rear are each defined by two panels pivotally mounted at on end to the cage side and pivotally connected at the other end to a link holds the other ends spaced but which allows the panels to pivot side to side in the corner of a narrow alleyway.

23 Claims, 7 Drawing Sheets

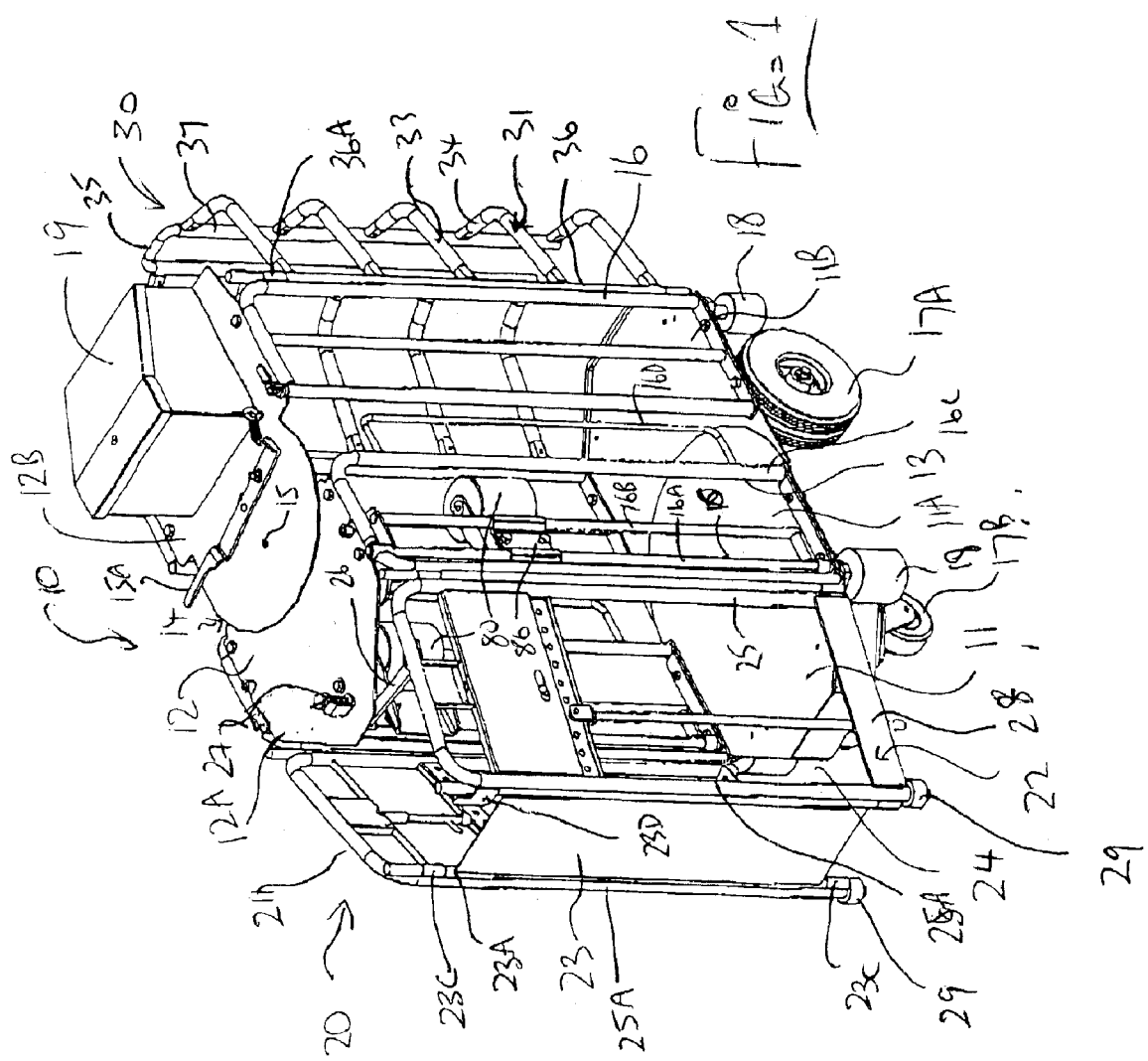

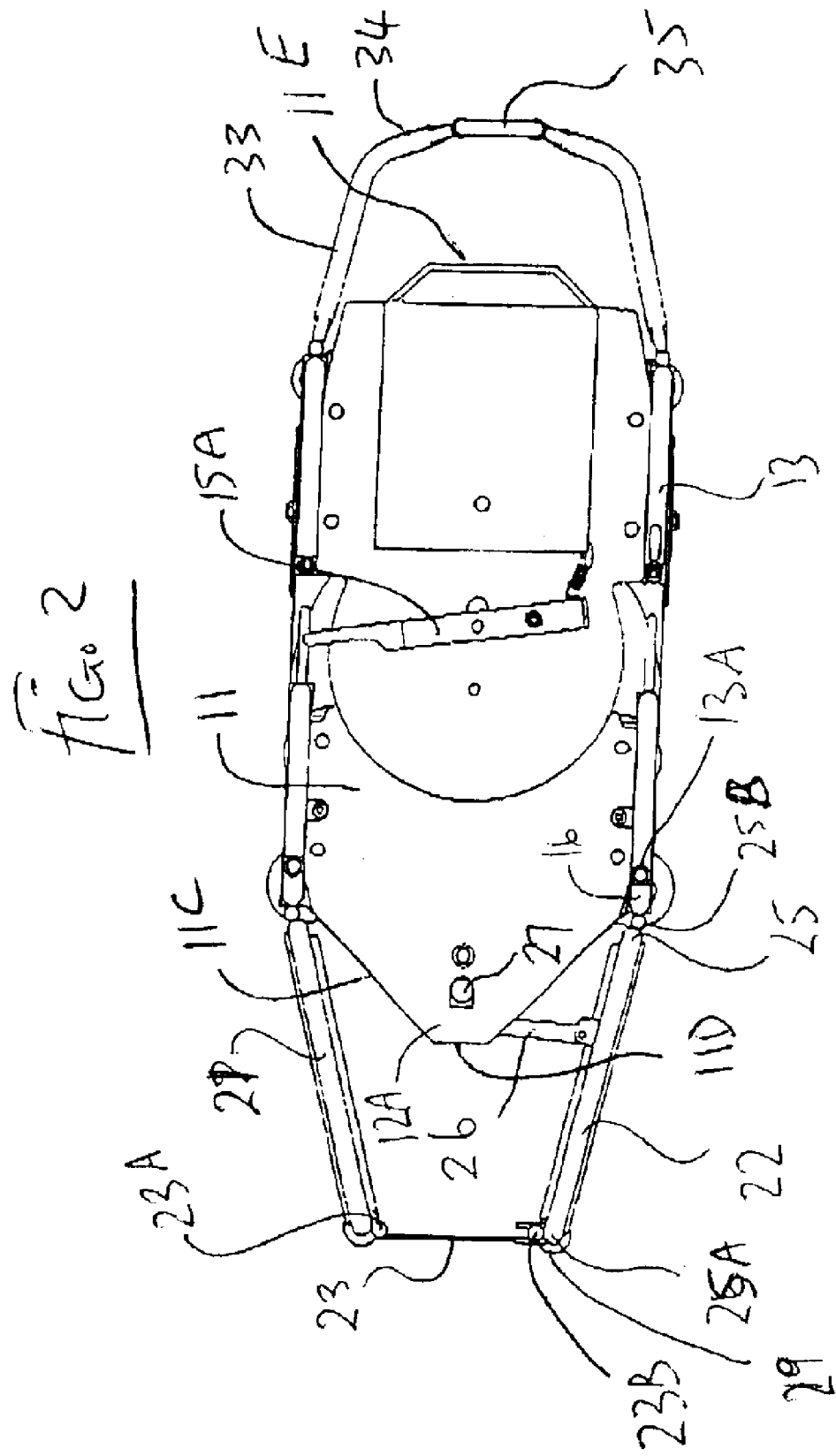

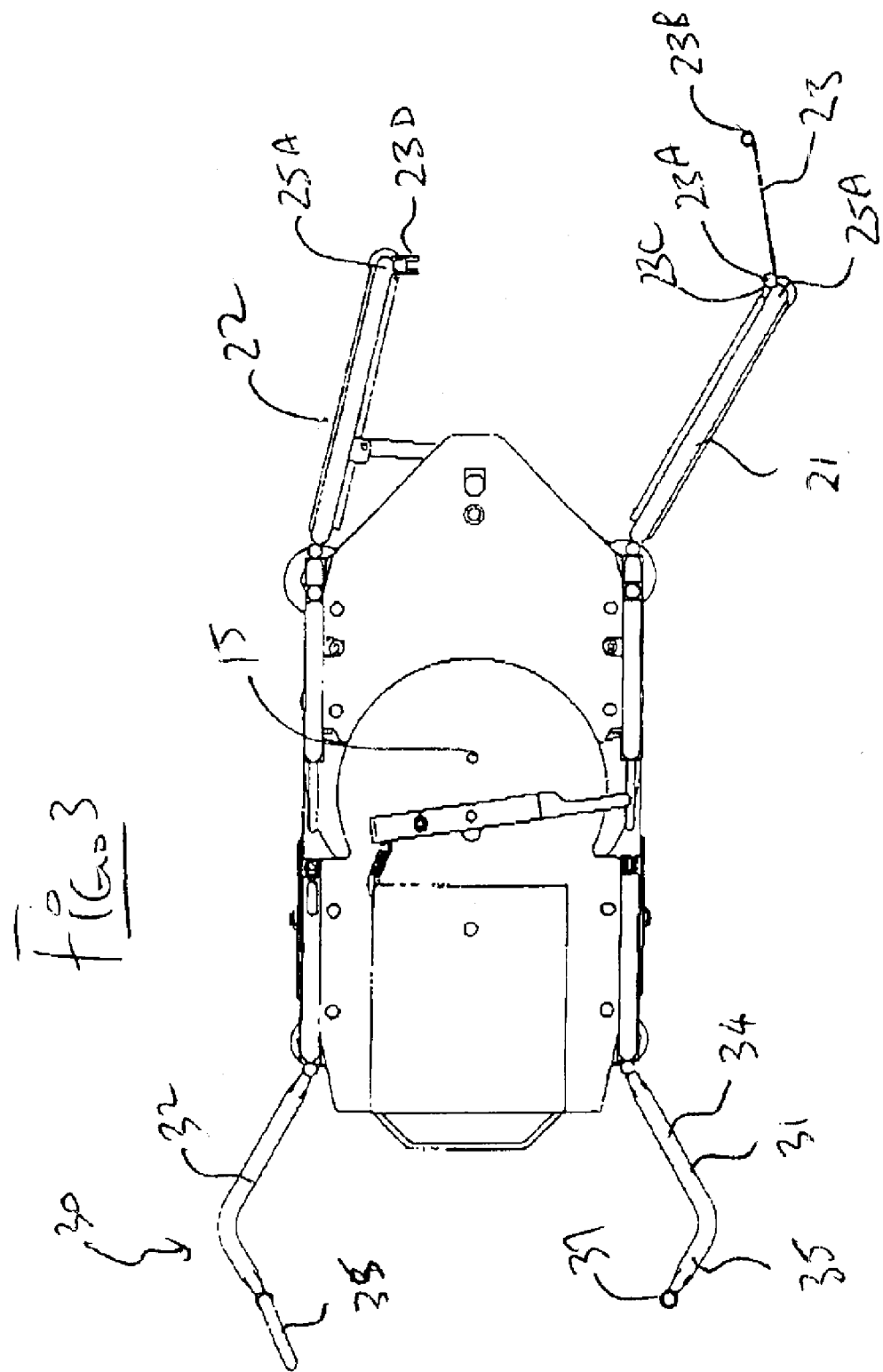

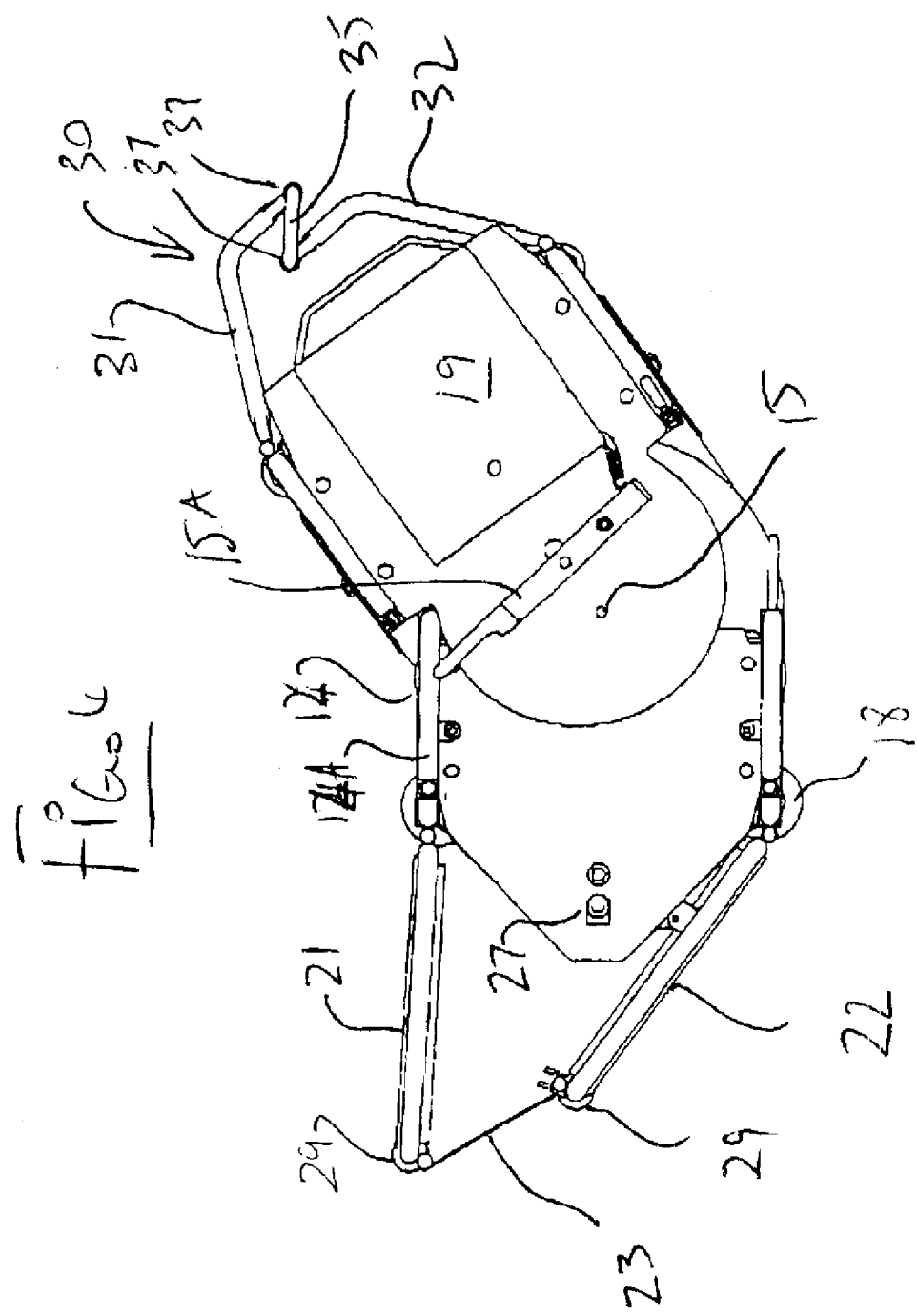

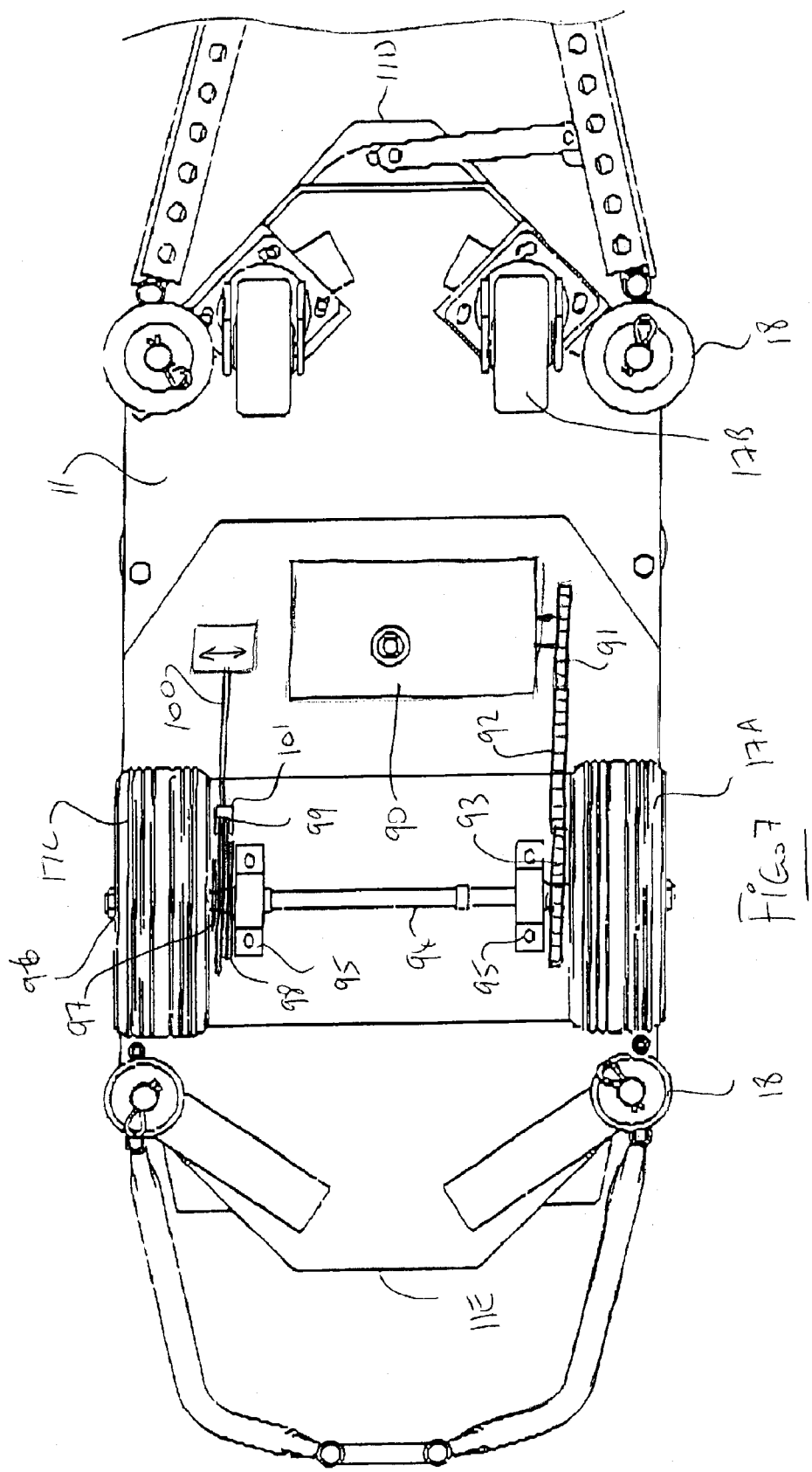

BOAR CART FOR INSEMINATION OF SOWS

This invention relates to a boar cart for use in transporting a boar adjacent to a series of pens containing sows during insemination of the sows.

BACKGROUND OF THE INVENTION

In high intensity rearing of pigs, sows after farrowing are moved to an area where they are maintained in separate pens awaiting insemination at the suitable time of estrous. The sows are maintained in separate pens in rows on one or both sides of dividing alleyways so that the farm hand can move along the row of sows both at the front and rear to access the sows for insemination and for various other purposes.

The alleyways between the rows can range in width from 24 inches up to 36 inches in most cases and in some cases the alleyways are wider still. The alleyways are defined between rows of pens and of course at the end of the rows the alley turns through a right angle so that passage can be obtained along one end of the rows and then back between the next set of rows where another right angle turn is required.

It is well known in artificial insemination that it is desirable to bring a boar to the sows both for the purposes of stimulating the sows by close physical contact with the boar and for determining whether a particular sow is in estrous. The presence of the boar is known to improve the effectiveness of the artificial insemination both by allowing the farm hand to more accurately determine the presence of estrous and in addition to place the sow in a more accepting condition for the insemination.

Conventionally a boar is led along the front of the stalls so as to physically contact or approach each sow in turn while the farm hand takes the necessary actions for carrying out insemination of those sows found to be in estrous. This requires the manual handling of a very large powerful animal by one or more additional farm hands.

Attention has therefore been given to design a device which allows the boar to be moved or transported along the alleyway in front of the row of sows in their pens while the farm hand carries out the necessary actions for insemination. It is clearly desirable if such a device is remotely controllable so that the farm hand at the rear of the animal can operate the device to move the boar to the required position adjacent the sow involved.

Previous carts have been manufactured for this purpose which are rigid and relatively long thus preventing their movement around corners from one alleyway to another. Because of this difficulty such carts have little commercial applicability and thus have achieved little success, although some limited use in specific barns has been obtained.

In U.S. Pat. No. 6,196,975 (Labrecque) of the present assignees and issued March 2001 is shown a cart for transporting a boar for use in insemination of sows. The cart is formed in two separate pieces which allow the cart to be separated at a corner into the two pieces so that the cart can be manoeuvred around the corner. However this arrangement had the disadvantage that the animal may have to be removed from the cart at the corner and returned to the cart after the corner.

In U.S. Pat. No. 6,336,426 now assigned to the present assignees is disclosed a modified cart of the type shown in the above patent in which the cart is formed in two sections which are pivotal about a vertical pivot axis on the center line so that the cart can be articulated with the animal still contained around a corner. The cart disclosed also is arranged to reduce the overall effective length of the cart at the corners by providing a bowed front and rear panel.

In a brochure published by Jerome Mack is disclosed a simple cart without a floor which guides the animal in a required direction along an alleyway.

However the articulated carts still have difficulty in negotiating the narrowest alleys at the corners. In addition, the articulation is a relatively expensive construction so that an alternative arrangement for allowing cornering even at wider alleyways is desirable.

SUMMARY OF THE INVENTION

It is one object of the present invention to provide an improved cart for transporting an animal which is shaped an arranged to allow an improved cornering action of the cart at corners between alleyways.

According to the invention therefore there is provided a cart for carrying an animal through alleyways and around corners in the alleyways comprising:

a cage assembly for containing the animal including a cage floor on which the animal stands, two cage sides each on a respective side of a longitudinal center line of the cage assembly for confining the animal so that the animal is maintained extending longitudinally of the cage assembly, a cage front assembly and a cage rear assembly for confining the animal against forward and rearward movement;

the cage assembly being mounted on ground wheels for movement generally longitudinally along an alleyway carrying the animal within the cage assembly;

at least one of the cage front assembly and the cage rear assembly comprising two upright side panels and a coupling member therebetween;

each of the side panels having a first upright edge connected to a respective one of the cage sides for pivotal movement about an upright axis at the cage side;

each of the side panels having a second edge generally parallel to the first upright edge and spaced away from the cage side such that pivotal movement of the side panel about the upright axis causes the side panel to swing side to side relative to the cage side;

the coupling member being connected between the side panels at the second edges thereof and being arranged to allow relative pivotal movement between each side panel and the coupling member;

the side panels and the coupling member being free to pivot such that contact between the side panel of one cage side and a wall of an alleyway will cause the side panels and the coupling member to pivot away from the contact toward the other cage side.

Preferably the coupling member has a width between the side panels which is less than the spacing between the cage sides such that the side panels extend generally outwardly from the cage assembly and toward a center line of the cage assembly.

While it is preferred that both the front and rear cage assemblies are formed from the panels and the coupling member, an advantage may in some cases be obtained merely by forming one of these constructions in this manner while the other is merely a fixed panel of the type described in one or other of the above patents.

Preferably the side panels at the front are generally planar.

Preferably the side panels at the rear each include a first generally planar portion at a first angle relative to the respective cage side and a second generally planar portion at a second greater angle to the cage side.

Preferably the coupling member at the front comprises a panel closing the space between the second edges, thus preventing the animal from viewing directly ahead and from inserting its snout into the pivot area.

Preferably the coupling member at the rear comprises a merely link connecting the second edges of the side panels but leaving the space therebetween open, since the rear assembly needs only to confine the rear end of the animal.

Preferably the link at the rear end of the cart located between side panels at the rear end is removable to allow the side panels at the rear end to pivot apart for loading and unloading of the animal.

Preferably the coupling member or link at the rear is arranged to allow movement of the side panels from a position in which the second edges are spaced apart to a position in which the second edges overlap.

In one arrangement the cage assembly has a front portion including parts of the cage sides and the front cage assembly for receiving the front feet and forward portion of the animal and a rear portion including parts of the cage sides and the rear cage assembly for receiving the rear feet and rearward portion of the animal and wherein the front portion is connected to the rear portion for pivotal movement about at least one vertical pivot axis to allow the cage assembly to navigate around a corner from one alleyway to another.

In another construction the cage assembly has a rigid structure with the cage sides parallel and both the cage front assembly and the cage rear assembly each comprise two upright side panels and a coupling member therebetween.

It is a further object of the present invention to provide an improved cart for transporting an animal which is arranged to allow an improved cornering action of the cart at corners between alleyways.

According to a second aspect of the invention there is provided a cart for carrying an animal through alleyways and around corners in the alleyways comprising:

a cage assembly for containing the animal including a cage floor on which the animal stands, two cage sides each on a respective side of a longitudinal center line of the cage assembly for confining the animal so that the animal is maintained extending longitudinally of the cage assembly, a cage front assembly and a cage rear assembly for confining the animal against forward and rearward movement;

the cage assembly being mounted on ground wheels for movement generally longitudinally along an alleyway carrying the animal within the cage assembly;

the ground wheels including two drive wheels each adjacent a respective side of the cart;

a motor for driving the ground wheels for propelling the cart in an alleyway and around corners;

and a drive coupling operable such that in a first position the drive coupling communicates drive to both wheels for propelling the cart in a straight line along an alleyway and such that in a second position the drive coupling communicates drive to only one of the wheels for propelling the cart around a corner.

Preferably the cage assembly is operable to change from a first mode for moving in a straight line along an alleyway to a second mode for negotiating around a corner.

Preferably an operating mechanism operable to change the cage assembly from the first mode to the second mode is arranged to operate the drive coupling from the first position to the second position.

Preferably the cage assembly has a front portion including parts of the cage sides and the front cage assembly for receiving the front feet and forward portion of the animal and a rear portion including parts of the cage sides and the rear cage assembly for receiving the rear feet and rearward portion of the animal and wherein the front portion is connected to the rear portion for pivotal movement about at least one vertical pivot axis to allow the cage assembly to navigate around a corner from one alleyway to another.

Preferably the drive coupling includes a first coupling element for communicating drive from the motor to one of the wheels and a releasable second coupling element operable in a first position to communicate drive to the other of the wheels and in a second position to disconnect drive to the other of the wheels.

Preferably said one of said wheels is connected to a drive axle to which said motor is connected and wherein the releasable second coupling element comprises a disk lying in a radial plane of the axle and connected to said axle and movable axially into and out of connection with an axle portion connected to said other of said wheels.

It is a yet further object of the present invention to provide an improved cart for transporting an animal which is shaped and arranged to allow an improved guiding action of the cart at along alleyways.

According to a third aspect of the invention there is provided a cart for carrying an animal through alleyways comprising:

a cage assembly for containing the animal including:

a cage floor on which the animal stands, two cage sides each on a respective side of a longitudinal center line of the cage assembly for confining the animal so that the animal is maintained extending longitudinally of the cage assembly, a cage front assembly, and a cage rear assembly for confining the animal against forward and rearward movement;

the cage assembly being mounted on ground wheels for movement generally longitudinally along an alleyway carrying the animal within the cage assembly;

and two guide rollers for engaging respective sides of the alleyway;

each guide roller being mounted on a respective cage side at a height above the cage floor so as to project outwardly from the cage side;

each guide roller being rotatable about a generally upright axis so as to provide a peripheral surface which is arranged to rolls along an abutment along the side of the alleyway;

each guide roller being mounted for adjustment of the height thereof from the cage floor;

and each guide roller being mounted for adjustment of a distance of the peripheral surface thereof from the cage side.

Preferably each cage side includes a plurality of vertical bars and wherein each guide roller includes a bracket which clamps to two parallel bars so that height adjustment is obtained by moving the bracket along the bars.

Preferably the two parallel bars are mounted on the cage side for pivotal movement about a vertical axis so as to pivot the bracket inwardly and outwardly relative to the cage side.

Preferably the vertical axis is longitudinal of one of the bars so as to pivot the bracket and the other bar inwardly and outwardly relative to the cage side.

BRIEF DESCRIPTION OF THE DRAWINGS

Embodiments of the invention will now be described in conjunction with the accompanying drawings in which:

FIG. 1 is an isometric view of a cart according to the present invention showing the cart in the straight ahead position.

FIG. 2 is a top plan view of the cart of FIG. 1 with the cart in its straight ahead position.

FIG. 3 is a top plan view of the cart of FIG. 1 with the cart in its opened position.

FIG. 4 is a top plan view of the cart of FIG. 1 with the cart in its cornering position.

FIG. 7 is a bottom plan view of the cart of FIG. 1 in the straight ahead position and showing the drive system including the drive couplings which allow two wheel and one wheel drive.

DETAILED DESCRIPTION

Figure 6:
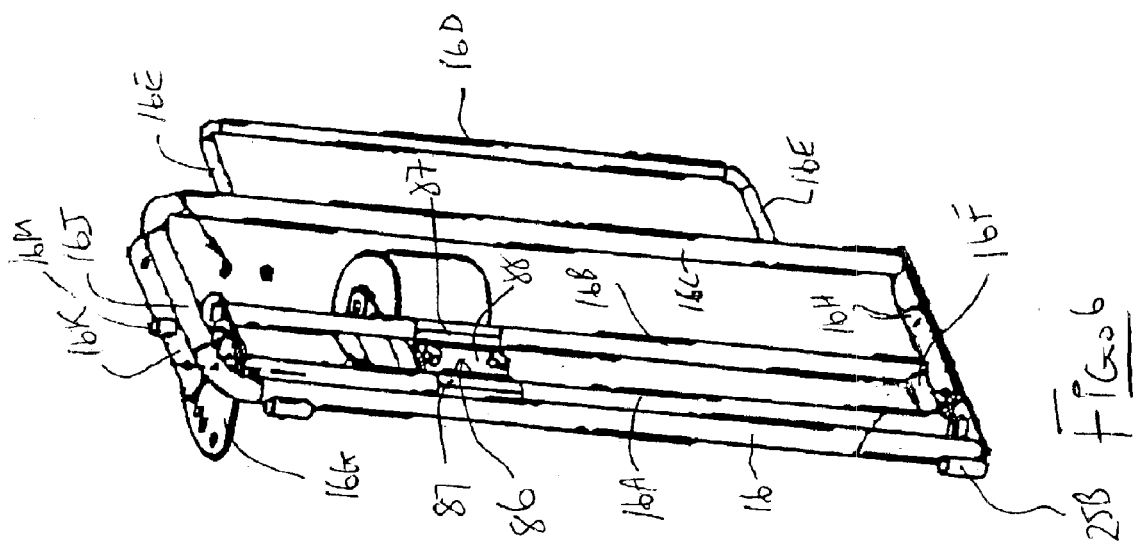
FIGS. 5 and 6 are isometric views of the cage side elements mounting the guide rollers.

The embodiment shown in FIGS. 1 through 4 forms a cart 10 for transporting an animal, particularly a boar, through an alleyway.

Many of the features of the cart are shown in the above U.S. Pat. No. 6,196,975 assigned to the present assignee including the general structure of the cage assembly, the ground wheels, the drive system, the guide rollers and the panels which are movable to prevent vision in one or other direction by the animal. As all of these features are clearly described in the above patent, the description is not repeated here for brevity and reference to that prior patent should be made for any details that are omitted herein. The description of the present arrangement hereinafter will therefore concentrate upon the important features of difference from the above patent.

In addition, the above U.S. Pat. No. 6,336,426 shows the construction of a center pivot and an overlying floor arrangement by which the cart is formed in front and rear sections which can pivot relative to one another about a vertical axis for assisting in negotiating corners. The location and arrangement of the pivot axis and the construction by which the pivoting movement is obtained shown in more detail in this patent to which reference can be made for any further details required.

In general, therefore, the cart 10 forms a cage with a floor 11, a top 12 and upstanding side walls 13 and 14. The floor 11 is formed in two pieces including a front piece 11A and a rear piece 11B and similarly the top is formed in a front piece 12A and a rear piece 12B. The top and the floor pieces are interconnected by pivot pins 15 which allow the cart to pivot about a common vertical axis passing through the floor and the top.

The sides of the cage are formed by bars 16 which interconnect the floor and the top. The bars of the rear section are separated from the bars of the front section allowing the cart to pivot about the vertical axis with the side walls expanding or contracting as required depending upon the direction of the pivotal action.

The cart is mounted on ground wheels including drive wheels 17A and caster wheels 17B for movement over the ground. Guide rollers 18 at the bottom of the cart at floor level are arranged to contact elements at the alleyway side when necessary to prevent hanging up of the cart. The electrical control system is indicated schematically at 19 and communicates power and control a motor 19A on the bottom of the floor which drives the ground wheels for forwarding the cart along an alleyway, as described in more detail hereinafter. Remote control to the electrical control system 19 is provided but not shown. The cage includes a cage front assembly 20 attached to a forward end of the side walls 13 and 14 so as to project forwardly therefrom and to bridge thereacross to retain the animal within the cage. In addition the cage assembly includes a rear cage assembly 30 which again extends rearwardly from the side walls and bridges across therebetween to retain the rear of the animal within the cage.

In an alternative arrangement (not shown) the cart including the floor, top and side walls can be formed as a rigid structure substantially of the construction shown in the above patent while utilising the same arrangement of front and rear cage assembly as described herein after.

The front frame assembly 20 comprises two side panels 21 and 22 and a center panel 23. Each of the side panels includes an open window 24 which can be closed by the application of a cover panel to inhibit the vision of the animal to that one side as described in the above patent.

Each of the side panels 21 and 22 includes a vertical rear edge 25 and a vertical front edge 25A which are formed by posts. The rear post is mounted on a collar 25B at a front post 13A of the side wall 13. Thus the side panel 22 can pivot side to side by the vertical axis defined by the collar 25B at the respective cage side. The side panels 21 and 22 are substantially symmetrical except that the side panel 22 carries a guide arm 26 which extends across from the side panel toward the top 12A where it can be locked by a spring pin 27 to hold the arm 26 in place and therefore to locate the side panel 22 at a predetermined angle relative to the cage side 13.

The center panel 23 has a width less than the spacing between the cage sides so that in the symmetrical position of the front gate assembly as shown in FIG. 1 and, the side panels 21 and 22 converge forwardly and inwardly in a tapering action.

Each of the side panels includes a bottom rail 28 interconnecting the posts 25 and 25A. On the bottom of the post 25A beneath the rail 28 is provided a roller 29 which acts to engage elements in the alleyway at to provide a pushing force on the side panel in a direction away from the engaged elements.

The center panel 23 is formed from a sheet of metal which carries at its vertical side edges a post 23A on one side and a post 23B on the opposed side. The post 23A is pivotally mounted in collars 23C attached to the post 25A of the side panel 21. Thus the center panel 23 is carried on the side panel 21 and can pivot about a vertical axis defined by the collar 23C at the post 25A of the side panel 21. The post 23B of the center panel 23 can be received within a receptacle 23D of the post 25A of the side panel 22 so that it can be latched in place within the receptacle or can be released from the receptacle to allow the front gate assembly to be opened. The receptacle provides a channel which allows the post 23B to rotate relative to the channel and thus relative to the post 25A of the side panel 22.

Thus the front gate assembly can take up a fixed central position located by the pin 27 and the arm 26 in which the side panels are symmetrical and the center panel is at right angles to the normal direction of movement as shown in FIGS. 1 and 2. The front assembly can also pivot to either side as shown in FIG. 4. Thus in FIG. 4 the side panel 22 has been pushed across toward the opposite gate side 14. The side panel 21 is of course also moved across to take up a position in which it is generally aligned with the forward part of the gate side as indicated at 14A. This movement of the side panels is caused by the pushing action on the roller 29 which causes the side panel 22 to move across the front face of the cage assembly with the side panel 21 being pushed by the center panel 23. This movement occurs only when the latch pin 27 is released when it is intended that the cage be moved around a narrow corner.

In addition to the side pivoting action of the front gate assembly, the main structure of the cage also pivots about the pivot axis 15 and this pivoting action can be locked by a lever 15A which holds the cage structure in the straight ahead position until required for cornering.

The rear gate assembly 30 comprises a pair of side panels 31 and 32 which are connected by a link 35.

Each of the side panels 31 and 32 comprises a first straight section 33 and a second straight section 34 arranged at an angle to the first. Thus as shown in the symmetrical position of FIG. 2, the first portion 33 extends rearwardly and inwardly at a shallow angle to the cage side and the second portion 34 extends rearwardly and inwardly at a sharper angle to cage side. The side panels 31 and 32 are formed of a post 36 which is attached to the end post 16 of the cage side on collars 36A. The side panel further includes a rear end post 37 at the end of the second straight section 34. The posts 36 and 37 are interconnected by a plurality of horizontal rails which define the two straight sections 33 and 34 to the rear post 37. The link 35 is not a closed sheet or panel in the form of the center panel 23 but is nearly a connecting piece which bridges the upper open ends of the posts 37. Thus the link forms a U-shaped member with a horizontal cross piece and a pair of vertical legs where each leg extends into an open upper mouth of the respective post 37.

There is no locking mechanism for the rear gate assembly so that it can pivot side to side but generally remains in the symmetrical position shown in FIGS. 1 and 2 due to the position of the rear end of the boar within the cart.

The three positions of the system are best shown in FIGS. 2, 3 and 4. In FIG. 2, the arrangement is shown in the symmetrical straight ahead position for movement along an alleyway in the manner described in the previous patents. The boar can stand on the floor 11 between a front floor edge 11C which is located in front of the cage sides and converges forwardly and inwardly to generally an apex 11D. The apex 11D is rearward of the front center panel 23 so that the front center panel defines the front of the structure without interference from the floor.

The rear edge of the floor is indicated at 11E which is again located in front of the rear end of the rear cage assembly and in front of the link 35 so the rear feet of the animal can stand on the floor while the rear end of the animal projects rearwardly into the area in front of the rear gate assembly.

In FIG. 4 is shown the cornering arrangement for cornering around a corner in the narrowest accessible alleyway which is generally 24 inches in width where the cornering action is obtained by the pivot about the center pivot 15 and by sideways movement both of the front cage assembly and the rear cage assembly. In the case of the rear cage assembly, it will be noted that the link 35 allows the rear posts 37 of the side panels 31 and 32 to overlap so that the structure at the rear takes up a very narrow and retracted position pushing against the rear end of the animal.

In FIG. 3 is shown the same construction in the opened condition for loading or unloading of an animal. In this condition the link 35 is separated from one of the posts 37 allowing the rear panels 31 and 32 to pivot apart to open the rear end for entry of the animal into the rear of the cage assembly. Also shown is the opening of the front section in which the post 23B of the center panel 23 is released from the receptacle 23D allowing the side panel 21 to be pivoted outwardly to one side for unloading of the animal. Normally of course only one of the front and rear will be opened for loading or unloading as required.

Figure 5:
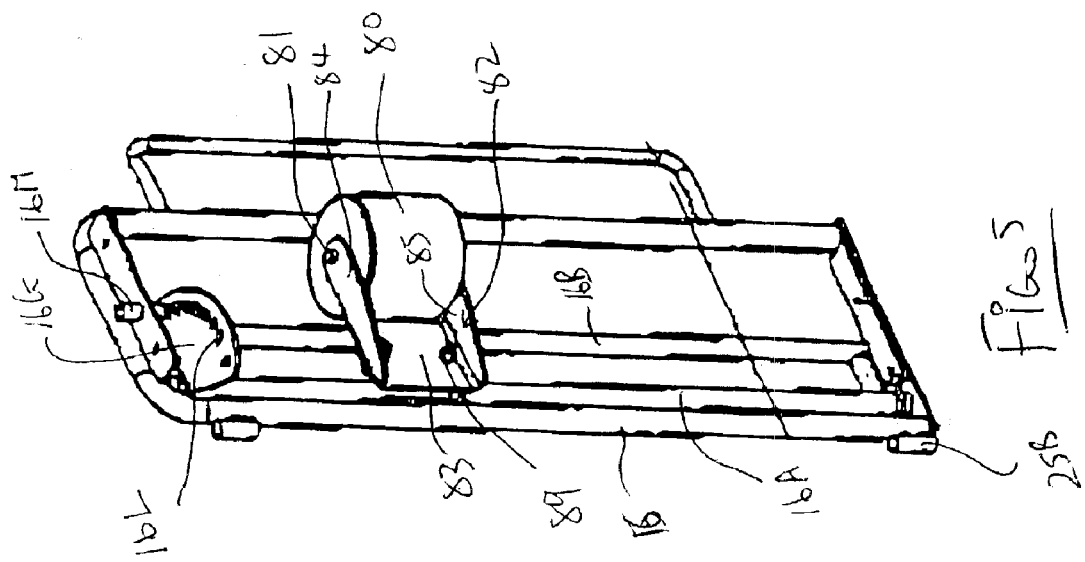

Turning now to FIGS. 5 and 6, the construction of the forward part of each of the cage sides is shown in more detail. Each of the cage sides includes the front post 16 and a plurality of further vertical bars or posts indicated at 16A, 16B and 16C. In addition a shorter post 16D is connected to the end post 16C by horizontal connection pieces 16E. The short post 16D bridges the gap between the front section and the rear section to inhibit the animal from escaping between the front and rear sections when turned in a direction to increase the spacing therebetween.

The post 16A is connected to the post 16B at the bottom by a horizontal connection piece 16F and the top by an adjustment plate 16G. Thus the post 16B is carried on the post 16A rather than on the bottom frame 16H which interconnects the posts 16 and 16C. At the top the plate 16G lies underneath a horizontal connection piece 16J connecting the post 16 and 16C. A horizontal flange 16K is connected to the inside surface of the cross member connector piece 16J. The post 16A is mounted on a pivot pin carried on the bottom frame 16H and a similar pivot pin on the cross member 16J. Thus the post 16A can rotate about a vertical axis along its length thus moving the post 16B inwardly and outwardly relative to the cage side. The angular position of the post 16B relative to the cage side is defined by selecting one of a plurality of holes 16L in the plate 16G and locating that hole at the required position by a spring pin 16M.

On the subassembly defined by the posts 16A and 16B is mounted a guide roller 80 which defines a vertical pivot pin 81 allowing rotation of the roller about a vertical axis. This defines therefore a peripheral surface which can roll along a suitable element of the alleyway as the cart moves along the alleyway. The roller 80 and the pin 81 are carried on a bracket 82 which includes a back plate 83 and a pair of horizontal supports plates 84 and 85 which are attached to the back plate 83. The back plate 83 is attached to the posts 16A and 16B by a clamping plate 86 which defines a pair of channels 87 on either side of a plate portion 88 which is fastened to the back plate 83 by bolts 89. Thus the posts 16A and 16B are clamped into the channels 86 and 87 by clamping together the plates 83 and 88. The height of the roller on the posts can be adjusted simply by releasing the fasteners 89 and sliding the clamping plates upwardly and downwardly along the posts to the height required where the periphery of the roller is located adjacent a suitable element of the alleyway.

The spacing of the outermost point of the peripheral surface of the roller welded to the cage side can be adjusted by rotating the subassembly defined by the posts 16A and 16B and the bracket 82 about the longitudinal axis of the posts 16A.

In operation where the alleyway is wider than the cart, the rollers are adjusted to the required location so that the spacing of the rollers is equal to substantially the width of the alleyway at the suitable abutment to which the height of the roller is adjusted. This adjustment can be effected simply by pulling the spring pin 16M and rotating the plate 16G to the required angle.

The cart can be set so that it runs along one side of the alleyway rather than the other by adjusting one of the rollers to a greater distance of spacing from the cage side than the other of the rollers.

Figure 8:
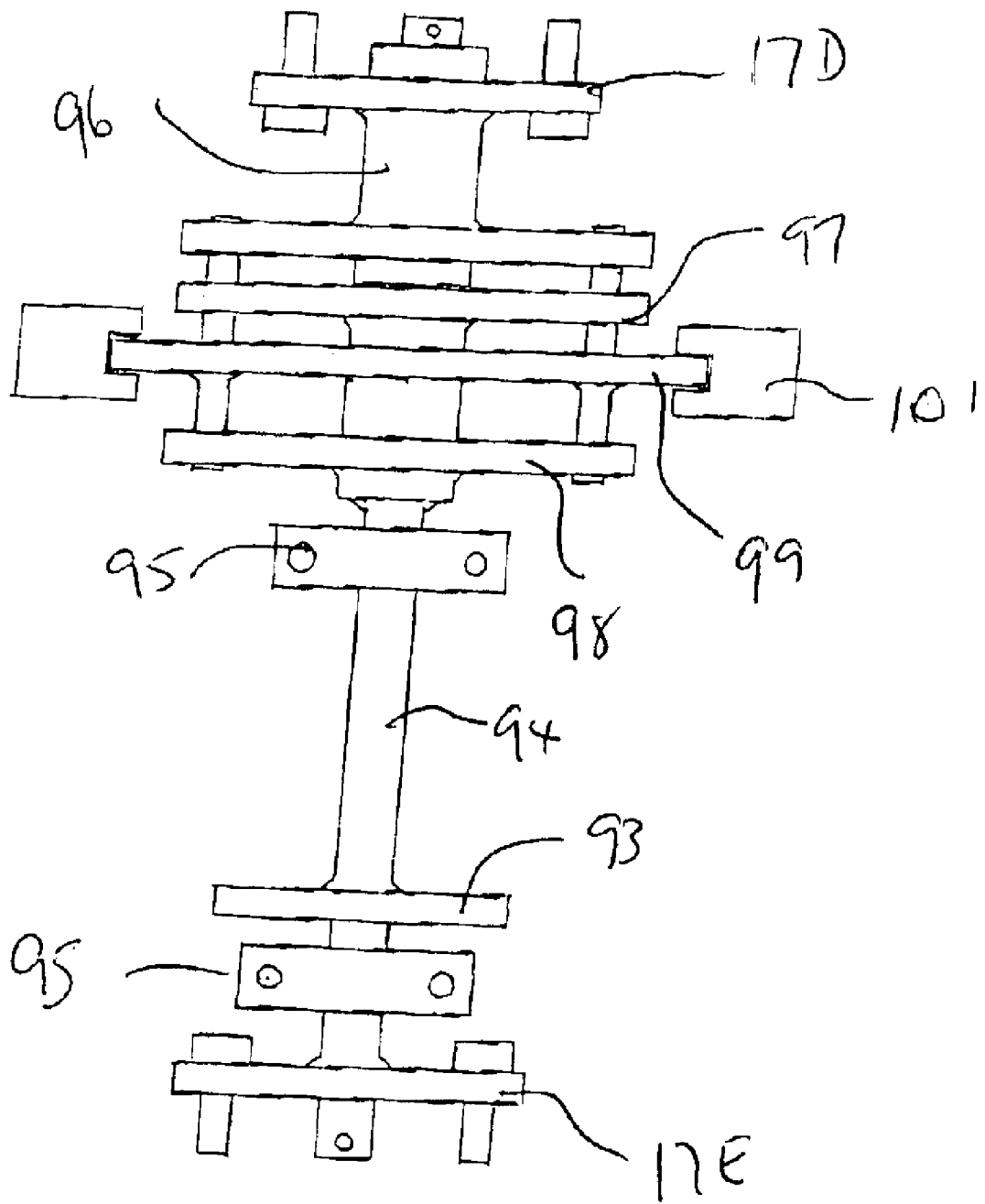
FIG. 8 is a bottom plan view similar to that of FIG. 7 of the cart of FIG. 1 on an enlarged scale showing only the drive couplings.

Turning now to FIGS. 7 and 8, the bottom of the cart is shown including the drive wheel 17A mounted on a hub 17E and the castor wheel 17B mounted on the underside of the floor 11. The drive motor 90 is located on the underside of the floor receiving power from the electrical control system 19 mounted on the top of the cart. The motor 90 drives a sprocket 91 which communicates drive through a chain 92 to a sprocket 93 on an axle 94 carried in bearings 95 and driving one of the wheels 17A. The other of the wheels indicated at 17C is mounted on a hub 17D a stub axle portion 96 carried on the axle 94 and rotatable relative thereto. The stub axle portion 96 carries a disc 97 parallel to a similar disc 98 carried on the axle 94. A moveable engagement plate 99 is carried between the discs 97 and 98 and is movable side to side by an operating device 100 and caliper 101. When moved to one side, the disc 99 communicates drive from the disc 98 on the axle 94 to the stub axle 96 thus driving the wheel 17C. When moved to the other side, the disc 99 is separated from the disc 97 so that the wheel 17C is free from the axle 94 and thus is not driven by the motor 90.

The operating device 100 is connected to the lever 15A on the top of the cart so that when the lever 15A is operated to release the lock which holds the cart in the straight ahead condition, the lever also operates the device 100 to release the drive coupling to a stub axle 96. In this way the operator needs to operate only the lever 15A to release the cart for cornering which also acts simultaneously to release the two-wheel drive driving the wheels 17A and 17C so that only the wheel 17A is driven during the cornering action. The single-wheel drive during cornering prevents the tendency of the two-wheel drive to forward the cart in a straight line direction from interfering with the cornering action.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. A cart for carrying an animal through alleyways and around corners in the alleyways comprising:

a cage assembly for containing the animal including a cage floor on which the animal stands, two cage sides each on a respective side of a longitudinal center line of the cage assembly for confining the animal so that the animal is maintained extending longitudinally of the cage assembly, a cage front assembly and a cage rear assembly for confining the animal against forward and rearward movement;

the cage assembly being mounted on ground wheels for movement generally longitudinally along an alleyway carrying the animal within the cage assembly;

at least one of the cage front assembly and the cage rear assembly comprising two upright side panels and a coupling member therebetween;

each of the side panels having a first upright edge connected to a respective one of the cage sides for pivotal movement about an upright axis at the cage side;

each of the side panels having a second edge generally parallel to the first upright edge and spaced away from the cage side such that pivotal movement of the side panel about the upright axis causes the side panel to swing side to side relative to the cage side;

the coupling member being connected between the side panels at the second edges thereof and being arranged to allow relative pivotal movement between each side panel and the coupling member;

the side panels and the coupling member being free to pivot such that contact between the side panel of one cage side and a wall of an alleyway will cause the side panels and the coupling member to pivot away from the contact toward the other cage side.

2. The cart according to claim 1 wherein the coupling member has a width between the side panels which is less than the spacing between the cage sides such that the side panels extend generally outwardly from the cage assembly and toward a center line of the cage assembly.

3. The cart according to claim 1 wherein the side panels are generally planar.

4. The cart according to claim 1 wherein the side panels each include a first generally planar portion at a first angle relative to the respective cage side and a second generally planar portion at a second greater angle to the cage side.

5. The cart according to claim 1 wherein the coupling member comprises a panel closing the space between the second edges.

6. The cart according to claim 1 wherein the panel forming the coupling member is arranged at the front end of the cart and is located between side panels at the front end.

7. The cart according to claim 1 wherein the coupling member comprises a link connecting the second edges of the side panels but leaving the space therebetween open.

8. The cart according to claim 7 wherein the link forming the coupling member is arranged at the rear end of the cart and is located between side panels at the rear end.

9. The cart according to claim 8 wherein the link at the rear end of the cart located between side panels at the rear end is removable to allow the side panels at the rear end to pivot apart for loading and unloading of the animal.

10. The cart according to claim 9 wherein the side panels include a first generally planar portion at a first angle relative to the cage side and a second generally planar portion at a second greater angle to the cage side.

11. The cart according to claim 1 wherein the coupling member is arranged to allow movement of the side panels from a position in which the second edges are spaced apart to a position in which the second edges overlap.

12. The cart according to claim 1 wherein the cage assembly has a front portion including parts of the cage sides and the front cage assembly for receiving the front feet and forward portion of the animal and a rear portion including parts of the cage sides and the rear cage assembly for receiving the rear feet and rearward portion of the animal and wherein the front portion is connected to the rear portion for pivotal movement about at least one vertical pivot axis to allow the cage assembly to navigate around a corner from one alleyway to another.

13. The cart according to claim 1 wherein the cage assembly has a rigid structure with the cage sides parallel and both the cage front assembly and the cage rear assembly each comprise two upright side panels and a coupling member therebetween.

14. The cart according to claim 1 wherein the ground wheels include two drive wheels each adjacent a respective side of the cart; wherein there is provided a motor for driving the ground wheels for propelling the cart in an alleyway and around corners; and wherein there is provided a drive coupling operable such that in a first position the drive coupling communicates drive to both wheels for propelling the cart in a straight line along an alleyway and such that in a second position the drive coupling communicates drive to only one of the wheels for propelling the cart around a corner.

15. The cart according to claim 14 wherein the cage assembly is operable to change from a first mode for moving in a straight line along an alleyway to a second mode for negotiating around a corner.

16. The cart according to claim 15 wherein an operating mechanism operable to change the cage assembly from the first mode to the second mode is arranged to operate the drive coupling from the first position to the second position.

17. The cart according to claim 14 wherein the cage assembly has a front portion including parts of the cage sides and the front cage assembly for receiving the front feet and forward portion of the animal and a rear portion including parts of the cage sides and the rear cage assembly for receiving the rear feet and rearward portion of the animal and wherein the front portion is connected to the rear portion for pivotal movement about at least one vertical pivot axis to allow the cage assembly to navigate around a corner from one alleyway to another.

18. The cart according to claim 14 wherein the drive coupling includes a first coupling element for communicating drive from the motor to one of the wheels and a releasable second coupling element operable in a first position to communicate drive to the other of the wheels and in a second position to disconnect drive to the other of the wheels.

19. The cart according to claim 18 wherein said one of said wheels is connected to a drive axle to which said motor is connected and wherein the releasable second coupling element comprises a disk lying in a radial plane of the axle and connected to said axle and movable axially into and out of connection with an axle portion connected to said other of said wheels.

20. The cart according to claim 1 wherein there are provided two guide rollers for engaging respective sides of the alleyway; wherein each guide roller is mounted on a respective cage side at a height above the cage floor so as to project outwardly from the cage side; wherein each guide roller is rotatable about a generally upright axis so as to provide a peripheral surface which is arranged to rolls along an abutment along the side of the alleyway; wherein each guide roller is mounted for adjustment of the height thereof from the cage floor; and wherein each guide roller is mounted for adjustment of a distance of the peripheral surface thereof from the cage side.

21. The cart according to claim 20 wherein each cage side includes a plurality of vertical bars and wherein each guide roller includes a bracket which clamps to two parallel bars so that height adjustment is obtained by moving the bracket along the bars.

22. The cart according to claim 21 wherein the two parallel bars are mounted on the cage side for pivotal movement about a vertical axis so as to pivot the bracket inwardly and outwardly relative to the cage side.

23. The cart according to claim 22 wherein the vertical axis is longitudinal of one of the bars so as to pivot the bracket and the other bar inwardly and outwardly relative to the cage side.

* * * * *